United States Patent [19]

Flenniken et al.

[11] Patent Number: 4,723,398
[45] Date of Patent: Feb. 9, 1988

[54] BAGGER FOR A FRONT MOUNT MOWER

[75] Inventors: John M. Flenniken, Beaver Dam; James E. Hardzinski, Horicon, both of Wis.

[73] Assignee: Deere & Company, Moline, Ill.

[21] Appl. No.: 862,856

[22] Filed: May 13, 1986

[51] Int. Cl.⁴ .............................................. A01D 35/22
[52] U.S. Cl. ........................................ 56/16.6; 56/202
[58] Field of Search ............... 56/16.6, 202, 197, 199, 56/271

[56] References Cited

U.S. PATENT DOCUMENTS

| 3,974,631 | 8/1976 | Rhodes | 56/202 |
| 4,103,477 | 8/1978 | Mullet et al. | 56/202 |
| 4,393,645 | 7/1983 | Moore | 56/202 |
| 4,487,007 | 12/1984 | Mullet et al. | 56/202 |
| 4,532,755 | 8/1985 | Schemelin et al. | 56/16.6 |
| 4,637,202 | 1/1987 | Lamusga | 56/202 |

OTHER PUBLICATIONS

Cushman, Front Line and Accessories.

*Primary Examiner*—Stephen J. Novosad
*Assistant Examiner*—William P. Neuder

[57] ABSTRACT

A bagger for a front mount mower including a bagger support attached to the drive vehicle at a point intermediate the operator's seat and the rear wheel. A pair of bag support rims are releasably attached to the bagger support and a pair of L-shaped bags are suspended on and depend from the respective rims. The L-shaped bags are supported over the mid-portion of the drive vehicle forward of the rear wheel. Each bag is contoured to provide a large capacity to receive clippings while being disposed in close proximity to the top and sides of the drive vehicle.

7 Claims, 2 Drawing Figures

BAGGER FOR A FRONT MOUNT MOWER

TECHNICAL FIELD

This invention relates to material collection systems, and more particularly to baggers for use in conjunction with front mount mowers.

BACKGROUND ART

Material collection systems for collecting clippings are highly desirable attachments for residential and commercial mowing machines. One system that has had a great deal of commercial success and acceptance, expecially with the residential customer, is the two-bag bagging system shown and described in U.S. Pat. No. 4,393,645. This two-bag system acts to divide the weight of the clippings into two containers that can be more easily handled by the operator. This system, which was designed for the conventionally mounted riding mower, is difficult to adapt to the front mounted mower since the mower is positioned a long distance away from the conventional bag position at the rear of the drive vehicle.

The long distance from the discharge of the front mounted mower deck to the rear of the vehicle sometimes requires the use of a power assist fan located in the chute connecting the mower discharge to the bagger. This, of course, adds to the initial cost of the machine and adds to the continuing maintenance requirements. One solution has been to use a rear discharge, rather than a side discharge, from the mower deck to minimize the distance the clippings must travel. Another attempt to minimize this distance includes the use of a bagger located on the side of the drive vehicle rather than at the rear. This side position causes uneven weight distribution on the machine as the bag fills with clippings. The weight of the clippings is substantial and can result in functional as well as safety concerns.

Those concerned with these and other problems recognize the need for an improved bagger for a front mount mower.

DISCLOSURE OF THE INVENTION

The present invention provides a bagger for a front mount mower including a bagger support attached to the drive vehicle at a point intermediate the operator's seat and the rear wheel. A pair of bag support rims are releasably attached to the bagger support and a pair of L-shaped bags are suspended on and depend from the respective rims. The L-shaped bags are supported over the mid-portion of the drive vehicle forward of the rear wheel. Each bag is contoured to provide a large capacity to receive clippings while being disposed in close proximity to the top and sides of the drive vehicle.

The bagger is fed by a chute interconnecting the side discharge port of the mower deck and a corresponding side opening in a bagger top that extends over the top of the pair of L-shaped bags. A top hinge mounting is carried on the bagger support to pivotally receive the bagger top. The L-shape bags include a narrow lower section and a larger top section, thus, the somewhat tapered receptacle is easier to empty than conventional bags.

An object of the present invention is the provision of an improved bagger for a front mount mower.

Another object is to provide a bagger for a front mount mower that provides for equal weight distribution on the drive vehicle as the bags fill with clippings.

A further object of the invention is the provision of a bagger for a front mount mower that is inexpensive to manufacture and maintain.

Still another object is to provide a bagger for a front mount mower wherein the bags are suspended in close proximity to the sides of the vehicle such that there is a minimum interference with obstacles during maneuvering of the mower.

A still further object of the present invention is the the provision of a bagger for a front mount mower wherein the bags are positioned and supported on the drive vehicle such that a portion of the bag weight is carried on the front drive tires.

Another object is to provide a bagger for a front mount mower that utilizes L-shaped tapered bags that are easily emptied of clippings.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
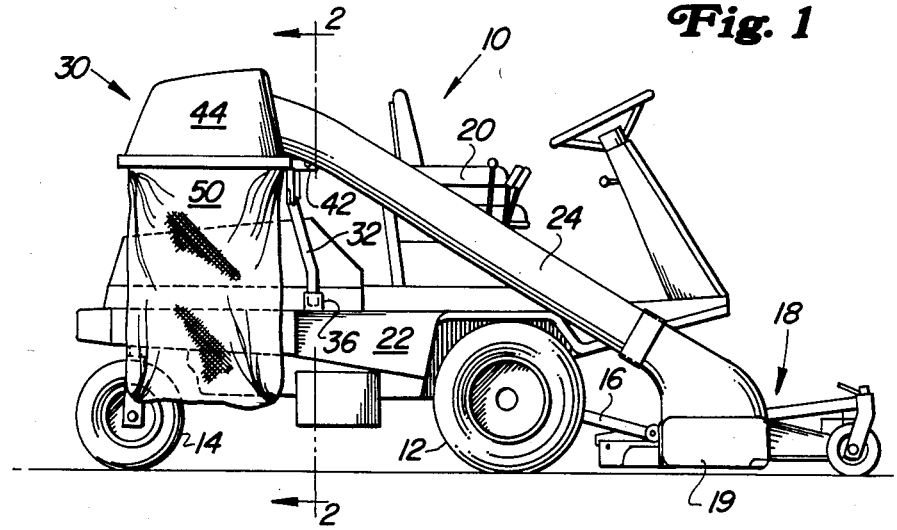
FIG. 1 is a side elevational view of a front mount mower utilizing the bagger of the present invention.

Referring now to the drawings, wherein like reference numerals designate identical or corresponding parts throughout the several views, FIG. 1 shows a drive vehicle (10) supported by a pair of front drive wheels (12) and a single rear wheel (14). A pair of forwardly extending push arms (16) are attached to a front mounted mower (18). The vehicle (10) includes an operator's seat (20) carried toward the forward end of the vehicle body (22). The mower (18) includes a side discharge opening (19) that is connected by a chute (24) to the bagger (30).

Figure 2:
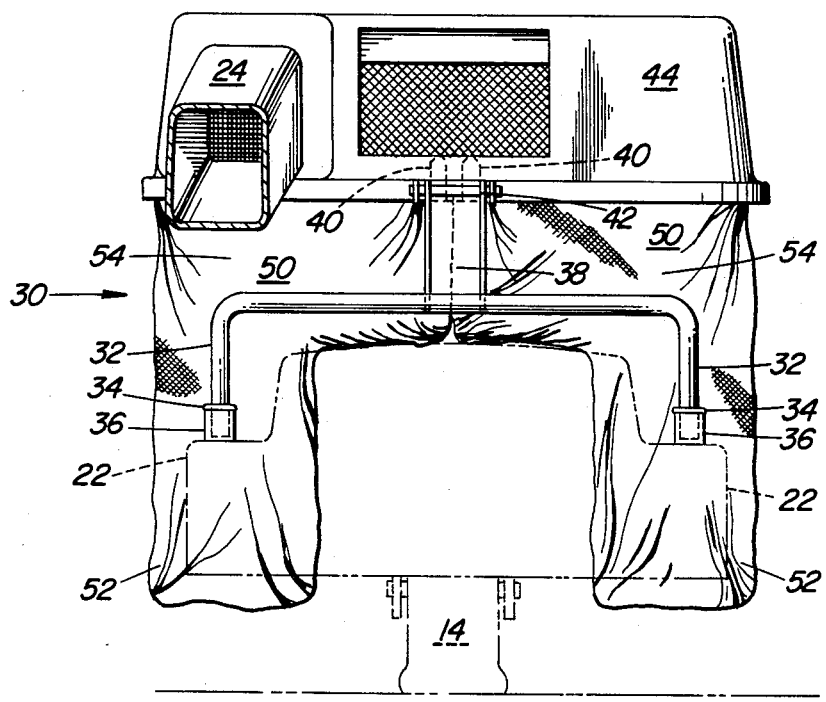
FIG. 2 is a front elevation sectional view taken along line 2—2 of FIG. 1, and illustrating the tapered L-shaped bags carried by the bagger support.

As best shown in FIG. 2, the bagger (30) includes a bagger support (32) releasably attached to the vehicle body (22). The bagger support (32) is a generally inverted U-shaped structure having an enlarged ring (34) formed near each end. Female fittings (36) are attached to the vehicle body (22). The opposite ends of the support (32) are received in the fittings (36) and supported by the enlarged rings (34). The central portion of the support (32) carries an upwardly extending plate (38). The uppermost portion of the plate (38) carries a pair of upwardly extending brackets (40) that are disposed to releasably support a pair of bag support rims (not shown). A hinge mounting (42) extends forwardly from the top portion of plate (38) and pivotally supports a bagger top (44) that extends over the top portions of a pair of L-shaped bags (50). The bag support rims and the attachment of the bags (50) to the rims is fully shown and described in U.S. Pat. No. 4,393,645, which is incorporated herein by reference.

The L-shaped bags (50) each include a narrow lower section (52) and a larger top section (54) that results in a generally tapered receptacle structure. The bags (50) are disposed to be supported in close proximity to the top and sides of the drive vehicle (10). As best shown in FIG. 1, the L-shaped bags (50) are supported over the mid-portion of the drive vehicle (10) forward of the rear wheel (14).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. A bagger for a vehicle having front wheels, at least one rear wheel and a mower deck operatively connected to said vehicle forward of said front wheels, said mower deck having a deck opening for discharging of clippings from said deck, said bagger comprising:
   a chute operatively connected to said deck opening;
   a support mechanism operatively connected to said vehicle between said front wheels and said rear wheel; and
   a clipping collection means operatively connected to said chute and said support mechanism, said collection means being positioned between said front wheels and said rear wheel and positioned straddling the width of said vehicle such that the weight of said clippings is distributed between said front wheels and said rear wheel and is distributed across the width of said vehicle.

2. The bagger of claim 1 wherein said clipping collection means further comprises:
   a bagger top operatively connected to said chute and said support mechanism; and
   a collection bag operatively connected to said bagger top and being disposed to straddle said vehicle such that said weight of said clippings in said bag is maintained between said front wheels and said rear wheel.

3. The bagger of claim 2 wherein said collection bag is further disposed to minimize said bag profile while keeping said vehicle as narrow as possible with said bag operatively positioned thereon.

4. The bagger of claim 3 wherein said bag is operative to distribute said clippings in said bag such that said vehicle will remain stable during the collection of said clippings in said bag.

5. The bagger of claim 1 wherein said clipping collection means further comprises:
   a pair of tapered bags attached to and disposed to depend from said support mechanism, said tapered bags being disposed and supported over the mid-portion of said vehicle forward of said rear wheel in close proximity to the top and sides of the drive vehicle.

6. The bagger of claim 5 wherein each of said bags includes a narrow lower section and a larger top section.

7. The bagger of claim 6 wherein each of said bags are L-shaped.

* * * * *